United States Patent
Rajendran et al.

(10) Patent No.: US 12,255,017 B2
(45) Date of Patent: Mar. 18, 2025

(54) SELF-SUPPORTING CARBON ELECTRODE

(71) Applicant: ZapGo Ltd, Harwell (GB)

(72) Inventors: Marappa Gounder Rajendran, Harwell (GB); Myrsini Kyriaki Antoniou, Harwell (GB); Stephen David Voller, Harwell (GB); Hugh Liam Sutherland, Harwell (GB)

(73) Assignee: ZapGo Ltd, Oxford (GB)

( * ) Notice: Subject to any disclaimer, the term of this patent is extended or adjusted under 35 U.S.C. 154(b) by 65 days.

(21) Appl. No.: 16/603,396

(22) PCT Filed: Apr. 6, 2018

(86) PCT No.: PCT/GB2018/050931
§ 371 (c)(1),
(2) Date: Oct. 7, 2019

(87) PCT Pub. No.: WO2018/185497
PCT Pub. Date: Oct. 11, 2018

(65) Prior Publication Data
US 2021/0090820 A1 Mar. 25, 2021

(30) Foreign Application Priority Data

Apr. 7, 2017 (EP) ..................................... 17386014
May 8, 2017 (GB) ..................................... 1707364

(51) Int. Cl.
*H01G 11/38* (2013.01)
*H01G 11/24* (2013.01)
*H01G 11/48* (2013.01)
*H01G 11/52* (2013.01)
*H01G 11/58* (2013.01)
*H01G 11/86* (2013.01)

(52) U.S. Cl.
CPC ............. *H01G 11/38* (2013.01); *H01G 11/24* (2013.01); *H01G 11/48* (2013.01); *H01G 11/52* (2013.01); *H01G 11/58* (2013.01); *H01G 11/86* (2013.01)

(58) Field of Classification Search
CPC ........ H01G 11/58; H01G 11/52; H01G 11/48; H01G 11/24; H01G 11/38; H01G 11/86
See application file for complete search history.

(56) References Cited

U.S. PATENT DOCUMENTS

| 8,377,590 B2* | 2/2013 | Park ...................... H01M 4/624 |
| | | 429/213 |
| 2004/0131934 A1* | 7/2004 | Sugnaux ................ H01G 11/24 |
| | | 429/231.1 |

(Continued)

FOREIGN PATENT DOCUMENTS

| CN | 1838999 A | 9/2006 |
| CN | 101763948 A | 6/2010 |

(Continued)

*Primary Examiner* — David M Sinclair
(74) *Attorney, Agent, or Firm* — Hodgson Russ LLP

(57) ABSTRACT

A self-supporting supercapacitor electrode adapted for attachment to an electrical circuit characterised by comprising a rigid or mechanically resilient, electrically-conductive sheet consisting essentially of a matrix of from 70-90% by weight of activated carbon and 5 to 25% by weight conductive carbon uniformly dispersed in from 5 to 20% by weight of a polymer binder.

8 Claims, 1 Drawing Sheet

(56) References Cited

U.S. PATENT DOCUMENTS

| | | | |
|---|---|---|---|
| 2005/0266298 A1* | 12/2005 | Mitchell | H01M 4/8896 |
| | | | 429/121 |
| 2006/0133012 A1 | 6/2006 | Zhong et al. | |
| 2008/0028583 A1 | 2/2008 | Shimoyama et al. | |
| 2008/0285208 A1* | 11/2008 | Sung | H01G 11/62 |
| | | | 361/502 |
| 2011/0075324 A1 | 3/2011 | Singh | |
| 2012/0014037 A1* | 1/2012 | Mastro | H01G 13/00 |
| | | | 361/502 |
| 2012/0081837 A1* | 4/2012 | Gadkaree | H01G 9/035 |
| | | | 361/502 |
| 2013/0056138 A1 | 3/2013 | Zhong et al. | |
| 2013/0148265 A1* | 6/2013 | Okuno | H01G 11/36 |
| | | | 361/502 |
| 2015/0062779 A1 | 3/2015 | Bankaitis et al. | |
| 2016/0042877 A1* | 2/2016 | Kokotov | H01G 11/38 |
| | | | 361/502 |
| 2017/0004930 A1* | 1/2017 | Picot | H01G 11/08 |

FOREIGN PATENT DOCUMENTS

| | | | | |
|---|---|---|---|---|
| CN | 103035416 A | * | 4/2013 | H01G 11/32 |
| CN | 102712479 B | * | 6/2015 | C01B 32/30 |
| CN | 105304350 A | | 2/2016 | |
| CN | 105551824 A | * | 5/2016 | H01G 11/32 |
| JP | 2003017370 A | | 1/2003 | |
| JP | 2013030694 A | | 2/2013 | |
| KR | 101484926 B1 | * | 1/2015 | |
| TW | 201221473 A | | 6/2012 | |
| WO | 2011/149807 A2 | | 12/2011 | |
| WO | 2012/151341 A1 | | 11/2012 | |
| WO | 2015/026881 A1 | | 2/2015 | |
| WO | 2015/031430 A1 | | 3/2015 | |
| WO | 2016/025532 A1 | | 2/2016 | |

* cited by examiner

SELF-SUPPORTING CARBON ELECTRODE

CROSS-REFERENCE TO RELATED APPLICATIONS

This application is a national stage entry under 35 U.S.C. § 371 of International Application No. PCT/GB2018/050931, filed Apr. 6, 2018, which claims priority to UK Patent Application No. 1707364.4, filed May 8, 2017, and EP Patent Application No. 17386014.9, filed on Apr. 7, 2017. The entire disclosures of the above-identified applications are hereby incorporated herein by reference.

FIELD OF THE DISCLOSURE

This invention relates to a self-supporting electrode made from a free-standing carbon-containing sheet which obviates the need for an associated metal current-collector to be used. The electrode is inter alia suitable for use as a component of a supercapacitor.

BACKGROUND OF THE DISCLOSURE

In recent years, supercapacitors, sometimes also known in the art by the equivalent term ultracapacitors, have attracted interest for energy storage applications because of their long cycle-life stability and their ability to rapidly accept and provide electrical charge. This makes them potentially attractive as replacements for or adjuncts to conventional lithium-ion batteries in a range of portable electrical devices such as smartphones, tablets, power drills and larger scale applications where the re-charging time is at a premium. To date, however, the relatively low energy densities per unit weight which can be achieved with supercapacitors has been a technical problem which has limited their uptake in many applications where size and weight are significant issues.

A typical supercapacitor consists of a cell comprised of at least two electrodes (anode and cathode) separated by an electrolyte and an ion-permeable insulator membrane. When a voltage is applied across the electrodes, the cations and anions in the electrolyte migrate respectively to the anode and cathode thereby creating opposed charge-bearing electrostatic double layers on their surfaces. These layers are then progressively destroyed as the supercapacitor is used and re-created as it is recharged. Thus, the higher the charge capacity associated with these layers per unit weight of the electrode, the more efficient and useful the supercapacitor becomes.

In our previous application, WO2016075431, we have described such a supercapacitor where the electrolyte is an ionic liquid or a mixture of ionic components at least one of which is an ionic liquid. The electrodes employed in these supercapacitors each comprise a metal current collector (typically a substrate such as aluminium foil) which is coated with a charge-carrying layer comprised of carbon particles having a large surface area. This coating is applied to the current collector by means of a printable 'ink' which, after application, is allowed to cure and dry.

A problem with this design of supercapacitor is that the charge capacity per unit weight of cell is too high for use in many applications; a problem which is exacerbated because such supercapacitors are often for commercial applications stacked in series to hold the requisite amount of total charge. One approach to solving this problem is therefore to work towards eliminating the current collector; the item which typically provides up to 50% of the overall weight.

SUMMARY OF THE DISCLOSURE

Accordingly, we have now developed an improved multi-carbon component electrode which is self-supporting, free-standing and which can be attached directly to external circuitry using only small metal coated tabs. Thus, according to one aspect of the present invention, there is provided a self-supporting supercapacitor electrode adapted for attachment to an electrical circuit characterised by comprising a rigid or mechanically resilient, electrically-conductive sheet consisting essentially of a matrix of from 70-90% by weight of activated carbon and 5 to 25% by weight conductive carbon uniformly dispersed in from 5 to 20% by weight of a polymer binder.

Suitably, the conductive sheet consists essentially of a matrix of from 75-90% by weight of activated carbon and 5 to 25% by weight conductive carbon uniformly dispersed in from 5 to 15% by weight of a polymer binder.

Preferably, the electrically-conductive sheet is mechanically resilient and has sufficient flexibility that it may be deformed into a convenient shape without surface cracking or complete fracturing. In one embodiment, the weight ratio of activated carbon to conductive carbon is greater than 5:1, suitably from 5:1 to 50:1 and is preferably in the range 8:1 to 20:1; most preferably 8:1 to 12:1 or 15:1 to 20:1 in order to obtain an optimum trade-off between the electrode's ability to store charge and it associated electrical resistance.

DETAILED DESCRIPTION OF THE DISCLOSURE

Figure 1:
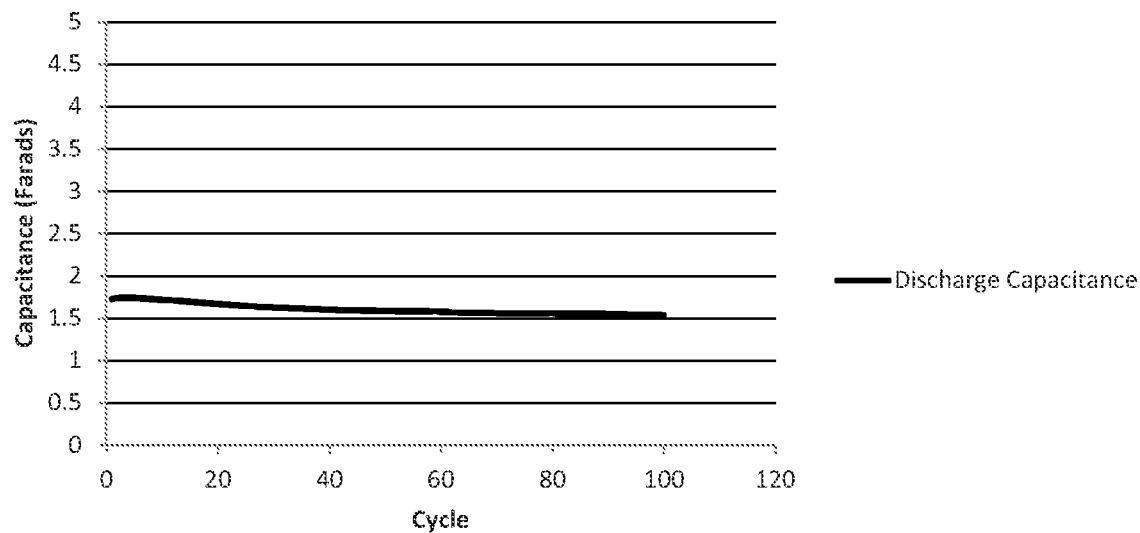
FIG. 1 is a graph depicting discharge capacitance over cycles of charge and discharge.

By the term activated carbon is meant a carbon whose surface area is typically greater than 500 $m^2g^{-1}$, suitably from 500 to 4500 $m^2g^{-1}$, more suitably from 500 to 3500 $m^2g^{-1}$, preferably from 500 to 3000 $m^2g^{-1}$ and most preferably from 1500 to 2500 $m^2g^{-1}$ or 1500 to 4000 $m^2g^{-1}$. In one embodiment, this component is particulate and the average maximum dimension of the particles is less than 25 microns; preferably in the range 6 to 12 microns or a finite dimension which is less than 1 micron. In another, it is fibrous and consists of micro- or nanofibers which can entangle with one another and the other components. In yet another embodiment, the component comprises a woven cloth which is infiltrated with the other components during the sheet's manufacture. All such materials are characterised by having a high degree of accessible microporosity allowing them to hold considerable quantities of electrical charge.

Typically, the activated carbon may be prepared by the carbonisation of a corresponding organic precursor at temperatures in excess of 500° C. in an oxygen-free atmosphere. Such an organic precursor may be lignocellulosic or non-lignocellulosic and optionally doped with a Group 1A metal salt such as a hydroxide like potassium hydroxide. However, it is preferred that the activated carbon is otherwise of high purity and has an ash content of less than 1%; preferably less than 0.5% by weight. In another embodiment, the carbonised product may be activated with steam before use. Where the component is fibrous or made of woven cloth, it may be prepared by carbonisation of a precursor fibrous polymer of polymer sheet; e.g. spun or woven polyethylene, polypropylene, or the like. In one embodiment, the activated carbon will have a specific capacitance in excess of 20 Farads per gram; suitably in the range 80 to 250 Farads per gram for example 100 to 200 Farads per gram.

Turning to the conductive carbon component, this component is included to provide improved electrical conductivity to the sheets. Suitably it comprises one or more highly conductive carbons selected from graphene and fullerenes such as carbon nanotubes and the like.

In one preferred embodiment, this component comprises graphene, single- and/or multi-walled carbon nanotubes or mixtures thereof. In another, the carbon nanotubes are characterised by having finite lengths of up to 5 microns and/or diameters in the range 1 to 20 nanometres and/or conductivities in excess of $10^6$ Siemens per metre. In one embodiment, the conductive carbon component comprises from 5 to 30% by weight of the electrode sheet. In yet another embodiment, the conductive carbon is a carbon black or includes carbon black amongst the other components mentioned above.

The binder is, in principle, any matrix which can confer mechanical rigidity or flexibility on the sheet. It is preferably a material which is resistant to the sorts of oxidation and reduction processes which will likely arise during the electrode's use. In one embodiment, the binder is an inert engineering plastic; for example a fluorinated polymer such as polytetrafluoroethylene or polyvinylidene fluoride. In another, it is a conducting polymer such as poly(3,4-ethylenedioxythiophene)-poly(styrene sulphonate) or polyaniline. In yet another embodiment, it is a mixture of a conducting polymer and, for example, one of the engineering plastics mentioned above, a cellulosic material such as carboxymethyl cellulose or the like and/or an elastomer such styrene-butadiene rubber. In this embodiment, the weight ratio of these two components should preferably be in the range 0.5:1 to 2:1. In another embodiment, the binder includes a polyelectrolyte component.

The electrode sheets of the invention typically have a density of greater than 0.4 grams per cc, an average gravimetric capacitance in excess of 100 Farads per gram.

In one embodiment, the electrodes described above will be cut or punched out of a larger sheet of material. They will be then be capable, if resilient, of being manipulated into any desired shape whilst remaining sufficiently strong to be used without the presence of a supporting substrate or a metal current collector. In such situations, the electrodes are further characterised by being attachable to metallic connectors which in turn can be attached to the wires of an electrical circuit. In one convenient embodiment, this is achieved but forming the electrode sheet, cutting an electrode out of it so that at one location a tab of material protrudes from the main body. This tab may then (1) be heat-treated with a polymer to infiltrate any interstices in the tab thereby preventing leaching of the electrolyte out of the supercapacitor during use and (2) thereafter metallised with a metal coating such as silver, copper or the like to create an electrical contact.

Supercapacitors using the electrodes of the invention and an ionic liquid electrolyte will typically have an equivalent series resistance (ESR) of less than 30 ohms when measured in coin cells over 100 cycles of charge and discharge. In an actual working device the ESR will typically be less than 100 milliohms, for example in the range 0.5 to 100 milliohms. These supercapacitors will also have a gravimetric conductance of greater than 100 Farads per gram and an energy storage capacity of greater than 6 Wh/kg when measured at an operating voltage of 3.5 Volts.

As mentioned above, the electrodes of the invention have particular utility in supercapacitor or ultracapacitors comprised of at least one unit comprising anode(s) and cathode(s) made from the sheet, an electrolyte and a membrane separator. However, they will likely have wider utility; for example in lithium-ion batteries. In one embodiment, the electrolyte is an ionic liquid. In another the anode(s) and cathode(s) are rendered asymmetric by being of different thicknesses or use of one or more pseudocapacitive additive(s) such as a metal oxide, semiconductor or conductive polymer. Suitably, the electrode sheets have a thickness in the range 100 to 350 microns. Each unit may be replicated by stacking the sheets side by side in series with intermediate membranes and filling the remaining void with the electrolyte. In such an embodiment, opposing sides of the sheet may function as anodes and cathodes in adjacent units. Individual units or stacks of units may optionally be contained within a leak-tight, lightweight pouch made for example of a polymer. The pouch itself may provide an extra degree of mechanical integrity to the supercapacitor if so desired.

According to another aspect of the invention there is provided a method of manufacturing the electrically-conductive sheet described above characterised by the steps of (1) mixing the binder with an aqueous solution under conditions of low shear; (2) thereafter adding the activated carbon and conductive carbons under conditions of high shear until a flexible dough is produced; (3) rolling the dough into sheets having a thickness in the range 100 to 350 microns and thereafter drying it. In an embodiment of this method, small amounts of an alcohol such as a $C_1$ to $C_6$ aliphatic alcohol and/or a surfactant may be added to the aqueous solution to ensure that after mixing the dough has a uniform distribution of the various carbon components as observed by electron microscopy. In another, the sheets produced in step (3) are subjected to an additional calendaring step.

The electrodes of the invention are now illustrated with reference to the following examples.

EXAMPLE 1—PREPARATION OF THE ELECTRODE SHEET

A solution of 10.5 g of aqueous isopropanol was mixed with 9.9 g of deionised water. To this was added 1.5 g of a 60% dispersion of PTFE (Density: 1.50 g/cm$^3$) in water (ex MTI Corporation) with constant stirring. YP-50 activated carbon (ex Kurary) and medium-walled carbon nanotubes (Nanocyl NC7000—to achieve high electrical conductivity, low ESR) were premixed at a weight ratio of 8:1. (9:1). 8 g (10.8 g) of the resulting mixture was the added to the solution under conditions of high shear in a laboratory mixer (Thinky ARE-250) operating at 800 rpm and mixing maintained for 5 minutes until a homogeneous dough was formed. The resulting dough weighed 30 grams and was then rolled into a sheet whose average thickness was 340 microns. The sheets were then dried at room temperature for 12 hours followed by 2 hours at 60° C. and 120° C. under vacuum. The dried product was stored in a dry box prior to cutting out electrodes for use in coin cell experiments.

Visual inspection using electron microscopy confirmed that the activated carbon and multiwalled carbon nanotubes were uniformly distributed throughout the binder matrix.

EXAMPLE 2—COIN CELL TESTING 16 mm discs of the electrode sheet were cut out using a punching machine. Conventional coin cells were then assembled for testing purposes using corresponding discs of dried Titanium-30 membrane separator (ex DreamWeaver Corporation) and EMIM TFSI (1-ethyl-3-methylimidazolium bis(trifluoromethylsulphonyl)imide) ionic liquid electrolyte. The filled coin cells were then sealed by crimping before undergoing testing.

Figure 2:
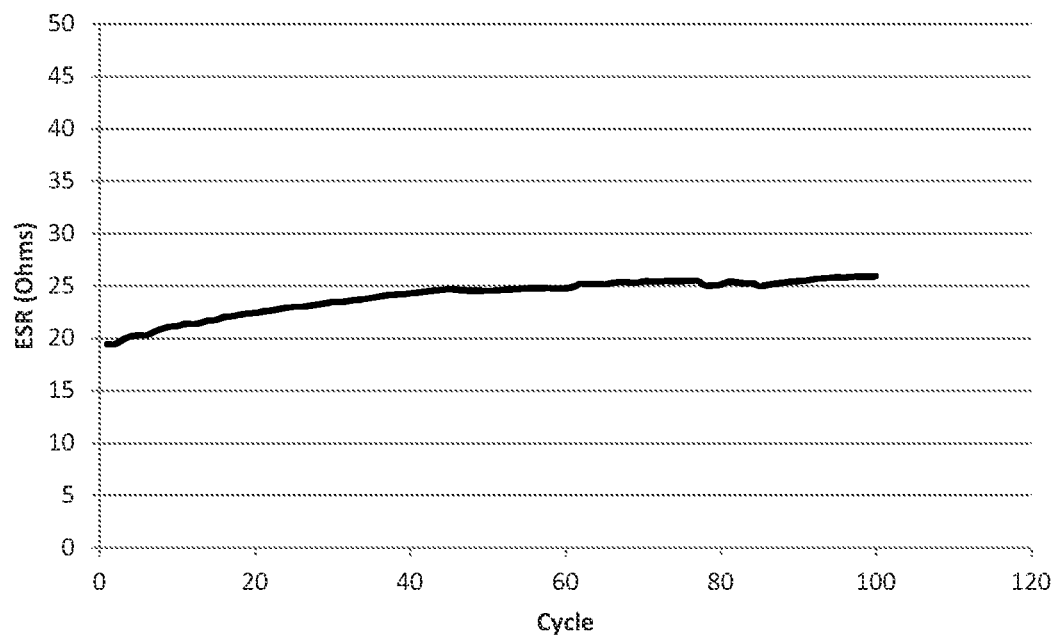
FIG. 2 is a graph depicting equivalent series resistance (ESR) over cycles of charge and discharge.

A coin cell was subjected to cycles of charge and discharge at a voltage of 3.5v and for each cycle the discharge capacitance and the equivalent series resistance (ESR) were measured. The results, illustrated graphically in FIGS. 1 and 2, show that the electrodes of the invention exhibit good capacitance stability as inferred from the discharge capacitance over multiple cycles and retain ESR after an initial conditioning phase.

The invention claimed is:

1. A supercapacitor comprising one or more units comprising an ionic liquid electrolyte, a membrane separator, and a self-supporting, free-standing supercapacitor electrode adapted for attachment to an electrical circuit characterised by comprising a free-standing rigid or mechanically resilient, electrically-conductive sheet consisting essentially of a matrix of from 70-90% by weight of activated carbon and 5 to 25% by weight conductive carbon; wherein the activated carbon and conductive carbon are uniformly dispersed in from 5 to 20% by weight of a polymer binder; wherein the electrodes are free-standing in that they are not supported by a metal current collector or a metal supporting substrate within the unit; and wherein the electrodes comprise a main body and a metallised or metallic tab for providing electrical connection to an external circuit; wherein the electrode sheet has a density of greater than 0.4 grams per cm$^3$; the electrode has a specific capacitance of greater than 100 Farads per gram; and the binder comprises a mixture of (i) a conducting polymer; and (ii) a fluorinated polymer, cellulosic material and/or an elastomer.

2. The supercapacitor as claimed in claim 1, characterised in that the weight ratio of activated carbon to conductive carbon is in the range 8:1 to 20:1.

3. The supercapacitor as claimed in claim 1, characterised in that the surface area of the activated carbon is in the range from 1500 to 2500 m$^2$g$^{-1}$.

4. The supercapacitor as claimed in claim 1, characterised in that the activated carbon has a specific capacitance in the range 100 to 200 Farads per gram.

5. The supercapacitor as claimed in claim 1, characterised in that conductive carbon is comprised of graphene, single-walled carbon nanotubes, multi-walled carbon nanotubes or mixtures of any of these components.

6. The supercapacitor as claimed in claim 1, characterised in that the electrode is from 100 to 350 microns thick.

7. The supercapacitor as claimed in claim 1, characterised in that the supercapacitor further comprises an additional electrode and wherein the additional electrode and the self-supporting, free-standing supercapacitor electrode are asymmetric and of differing thicknesses.

8. The supercapacitor as claimed in claim 1, characterised in that the supercapacitor further comprises an additional electrode and wherein the additional electrode and the self-supporting, free-standing supercapacitor electrode are rendered asymmetric by use of a pseudocapacitive additive.

* * * * *